Collins & McClure,
Derrick.
No. 94,475.   Patented Sep. 7, 1869.
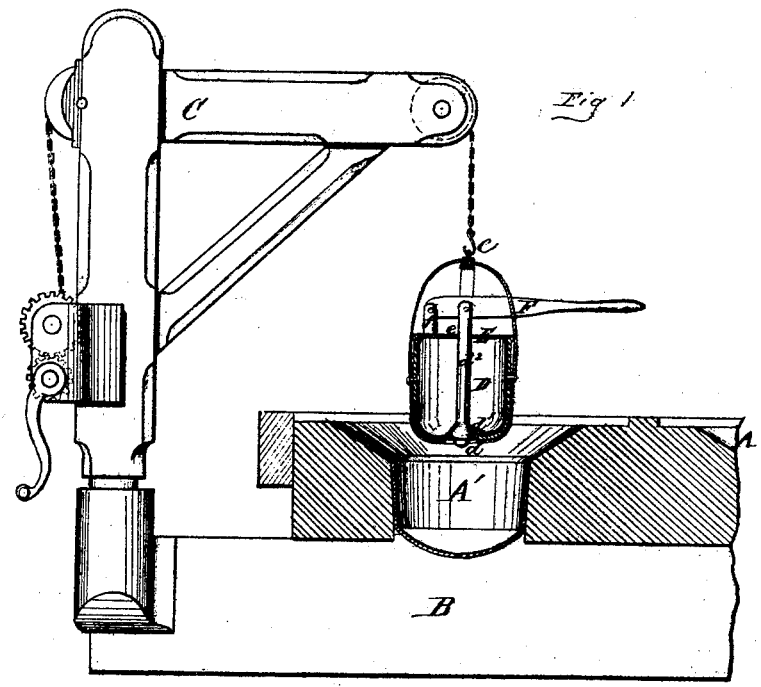
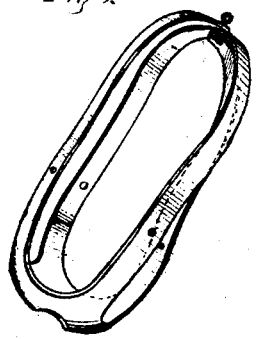
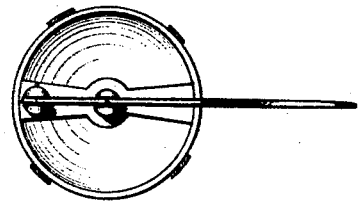
Witnesses
Charles F. Brown.
S. J. Rogers
Inventor
C. H. Collins & W. B. McClure.
by H. W. Beadle.
Attorneys.

United States Patent Office.

CHARLES H. COLLINS AND W. B. McCLURE, OF ALEXANDRIA, VIRGINIA.

Letters Patent No. 94,475, dated September 7, 1869.

IMPROVED APPARATUS FOR EMPTYING SUGAR-KETTLES.

The Schedule referred to in these Letters Patent and making part of the same.

*To all whom it may concern:*

Be it known that we, CHARLES H. COLLINS and W. B. McCLURE, both of Alexandria, in the county of Alexandria, and State of Virginia, have invented a new and useful Improvement in Lifting-Kettles; and we do hereby declare that the following is a full and exact description of the same, reference being had to the accompanying drawings, and to the letters of reference marked thereon.

This invention consists of an improved dipping-kettle, provided with a valve, operated by a lever, which is used, in connection with the ordinary boiling-kettle, in the manufacture of sugar. The details of construction and manner of operation will be fully described hereinafter.

In the drawings—

Figure 1 represents a sectional elevation of a portion of our invention.

Figures 2 and 3 represent views of parts detached.

To enable others skilled in the art to make and use our invention, we will now proceed to describe its construction and operation.

A A' represent a series of kettles, such as are used in the manufacture of sugar, beneath which is located the fire-chamber B.

C represents a derrick, of any suitable construction, which is arranged to swing over the kettle A', which is the smallest of the series.

D represents the lifting-kettle, which is attached by means of bands, as shown, to the derrick-hook $c$. This kettle, in size, is enough smaller than the kettle A' to fit snugly into it, and is provided, at the centre of its bottom, with the orifice $d$, as shown.

$d^1$ represents a valve, attached to the rod $d^2$.

E represents a cross-bar, provided with an orifice, $e$, through which passes the rod $d^2$.

This bar also furnishes a base for the fulcrum $f$ of the lever F, which latter is attached to the rod $d^2$, as shown in fig. 1.

The operation of our invention is as follows:

When the contents of the kettle A' are thoroughly cooked, and ready for removal, the dipping-kettle D is lowered into it with its valve open. As the latter sinks into the former, the liquid is necessarily forced to pass into it through the opening in its bottom.

When filled, the valve is closed, but before removing it, several pailfuls of juice are thrown around it from the adjoining kettle, which, running into the kettle A' as the kettle D is removed, washes the latter clean, and also prevents the former from becoming red hot, thus burning the residuum.

When the kettle is sufficiently elevated to clear the brick-work, the derrick is swung round until the proper point is reached, when the valve is opened and the contents of the kettle discharged.

This operation is repeated as often as is necessary.

The advantages obtained by the use of our kettle will be obvious when the ordinary method of dipping is fully understood.

A bucket is attached to the end of a long pole, having an enlarged or weighted end, to balance the bucket when full. With these buckets the contents of the kettles are transferred from and to each other, the edge of the brick-work forming a fulcrum, upon which the poles of the buckets are swung.

Six kettles are ordinarily employed. The juice, as fast as received, is put into the larger of the series, and as it arrives at a certain stage, is transferred to the others, until it finally reaches the last.

The five larger kettles are never empty, the liquid being replaced as fast as it is taken out. Moreover, these also are none of them directly over the fire; there is, therefore, no danger of their becoming overheated. The last of the series, however, is immediately over the fire, and from this the contents are all removed at one time. It is, therefore, impossible, when the buckets are used, to prevent the residuum left by the buckets from becoming burned, by which means the next kettle of syrup is reddened, and the whole batch of sugar deteriorated.

It often happens that the kettle becomes red hot when the juice is removed, and consequently, it is extremely liable to crack when the new liquid is poured in. Furthermore, if the dippers commence to work when the entire contents are properly cooked, the last bucketfuls are necessarily cooked too much, so that it is impossible to obtain good results by this system.

By the use of our kettle all these difficulties are obviated. The juice is all removed at once when properly cooked. The boiling kettle is never left without liquid in it, and cannot, therefore, get red hot; consequently, also, the slight residuum left is never burned. A much better quality of sugar can be obtained with much less trouble.

Having thus fully described our invention,

What we claim as new, and desire to secure by Letters Patent, is—

A dipping-kettle, provided with a valve, operated by a lever, when used in connection with a boiling-kettle, substantially as and for the purpose described.

This specification signed and witnessed, this 3d day of August, 1869.

CHAS. H. COLLINS.
W. B. McCLURE.

Witnesses:
E. A. CLARKSON,
S. J. NOYES.